(12) United States Patent
Liao

(10) Patent No.: US 6,322,855 B1
(45) Date of Patent: Nov. 27, 2001

(54) METHOD AND APPARATUS FOR COATING CONDUCTIVE METAL ONTO AN ELECTRODE FOR SURFACE MOUNTING CHIP COMPONENTS

(75) Inventor: Tzung-Pin Liao, Kaohsiung (TW)

(73) Assignee: Schmidt Scientific Taiwan Ltd., Taipei (TW)

( * ) Notice: Subject to any disclaimer, the term of this patent is extended or adjusted under 35 U.S.C. 154(b) by 0 days.

(21) Appl. No.: 09/563,962

(22) Filed: May 3, 2000

(30) Foreign Application Priority Data

Nov. 19, 1999 (TW) .............................. 88120284 A

(51) Int. Cl.⁷ .................. B05D 1/18; B05D 1/38; B05D 3/02; B05D 1/32
(52) U.S. Cl. .................. 427/431; 427/123; 427/282; 427/284; 427/295; 427/383.1; 427/383.7; 427/404; 427/405; 427/436
(58) Field of Search ..................... 427/123, 295, 427/284, 282, 383.1, 383.7, 404, 405, 431, 436; 118/406, 428, 429, 500, 505

(56) References Cited

U.S. PATENT DOCUMENTS

| 4,526,129 | 7/1985 | Braden . | |
| 4,859,498 | * 8/1989 | Yamaguchi | 427/96 |
| 5,120,577 | * 6/1992 | Yamaguchi et al. | 427/282 |
| 5,571,594 | * 11/1996 | Minowa et al. | 428/138 |

* cited by examiner

*Primary Examiner*—Michael Barr
(74) *Attorney, Agent, or Firm*—Henderson & Sturm LLP

(57) ABSTRACT

A method for coating conductive metal onto a electrode comprises a step of adhering a tape onto a first side of a tooling plate, a step of shaking electrodes to be fell into respective guiding holes of the tooling plate and to be held at first ends of the electrodes, a step of pre-pressing second ends of the electrodes in the guiding holes of the tooling plate, a step of holding the tooling plate with a vacuum holder to dip the second ends of the electrodes down into a liquid conductive metal trough, a step of re-dipping the tooling plate into the liquid conductive metal trough for modifying shapes of the first ends of the electrodes, a step of baking the second ends of the electrodes, a step of adhering another tape onto a second side of the tooling plate and removing the tape at the first ends of the electrodes, a step of pre-pressing the first ends of the electrodes, a step of holding the tooling plate with the vacuum holder to dip the first ends of the electrodes into the liquid conductive metal trough, a step of baking the first ends of the electrodes, and a final step of tearing off the tape.

4 Claims, 3 Drawing Sheets

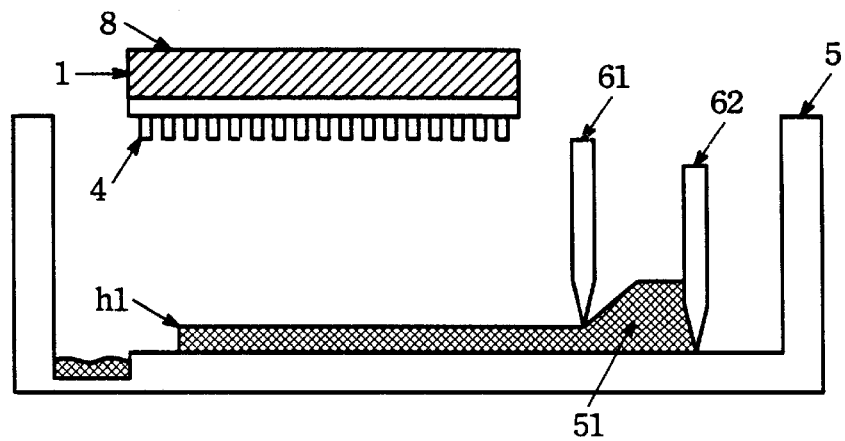
FIG.2 (d-1)
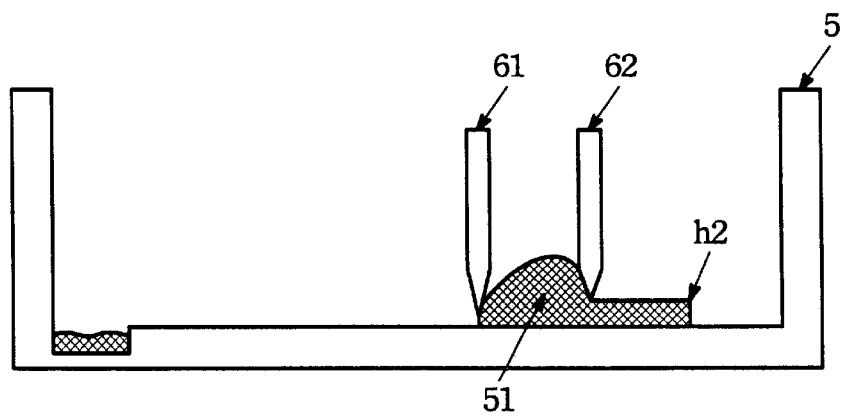
FIG.2 (d-2)
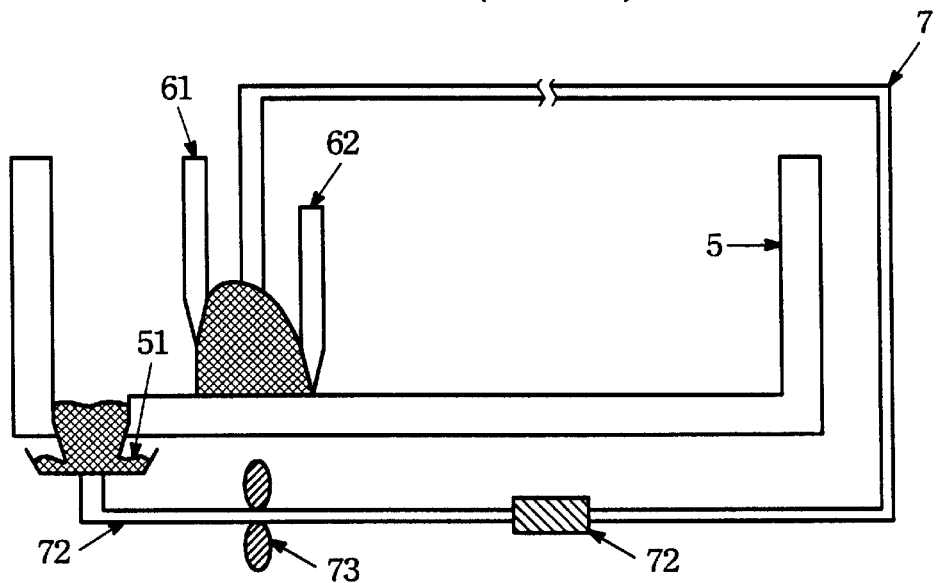
FIG.2 (d-3)

METHOD AND APPARATUS FOR COATING CONDUCTIVE METAL ONTO AN ELECTRODE FOR SURFACE MOUNTING CHIP COMPONENTS

BACKGROUND OF THE INVENTION

1) Field of the Invention

The invention relates to a method for coating conductive metal onto an electrode, and more particularly to a method for promoting production and quality upon coating of the conductive metal on the electrode, in which the electrode is a rod-like element for being used in a surface mounting chip component.

(2) Description of the Prior Art

A method for coating conductive metal on an electrode was described in U.S. Pat. No. 4,526,129 in which a silica gel plate having a plurality of apertures thereon arranged by a square array pattern is used for holding surface mounting chip components. Furthermore, the silica gel plate includes alignment plugs for engaging face-to-face with a planting plate, in which the planting plate includes a plurality of guiding holes arranged in correspondence with the apertures of the silica gel plate. In the disclosure, the electrodes for surface mounting chip components are planted into the guiding holes temporarily. By using a plurality of pins arrayed at the same square pattern, those electrodes can be planted into the respective guiding holes of the planting plate. Thereafter, the silica gel on the silica gel plate can catch the electrodes by the inherent elasticity. Finally, by utilizing a pair of elevator plates engaged to respective recesses located at opposing sides of silica gel plate, portion of those electrodes exposed out of the silica gel plate can be dipped into a trough of liquid conductive metal for dipping process.

It is easy to understand that there are several disadvantages in the aforesaid prior art.

(1) The trend of miniaturizing electronic elements makes also the miniature of the surface mounting chip components as well as the electrodes. Therefore, due to the tiny sizes of the surface mounting chip components, the pins have to be made finer so that the electrodes for the surface mounting chip components can be successfully pressed through the guiding holes of the planting plate. Obviously, such a miniaturization design will inevitably lead to the breakage of the pins, and damages of the pins, electrodes, chips or plates thereunder.

(2) After a certain period of usage, the silica gel will become aged. Thus, the adhering property of silica gel will be reduced, so that the automatic peeling-off of the electrodes from the silica gel may occur and may lead to possible damage.

(3) Because the electrodes for the surface mounting chip components are basically adhered by the elasticity of the silica gel, the area proportion of the silica gel on the silica gel plate can not be reduced. Thus, it will limit the quantity of the electrodes that can be planted on the silica gel plate.

SUMMARY OF THE INVENTION

Accordingly, it is a primary object of the present invention to provide a method for coating conductive metal onto a rod-like electrode for surface mounting chip components. It can make dipping process simply and make the electrode easily to be planted onto a tape.

It is a secondary object of the present invention to provide a method for coating conductive metal onto an electrode for surface mounting chip components, by which the quantity of the electrodes planted on the tape plate can be increased.

Both of these objects can be achieved by the method for coating conductive metal onto an electrode for surface mounting chip components described below.

BRIEF DESCRIPTION OF THE DRAWINGS

The present invention will now be specified with reference to its preferred embodiment illustrated in the drawings, in which.

DESCRIPTION OF THE PREFERRED EMBODIMENT

The invention disclosed herein is directed to a method and an apparatus for coating conductive metal onto an electrode for surface mounting chip components. In the following description, numerous details are set forth in order to provide a thorough understanding of the present invention. It will be appreciated by one skilled in the art that variations of these specific details are possible while still achieving the results of the present invention. In other instance, well-known components are not described in detail in order not to unnecessarily obscure the present invention.

Figure 1:
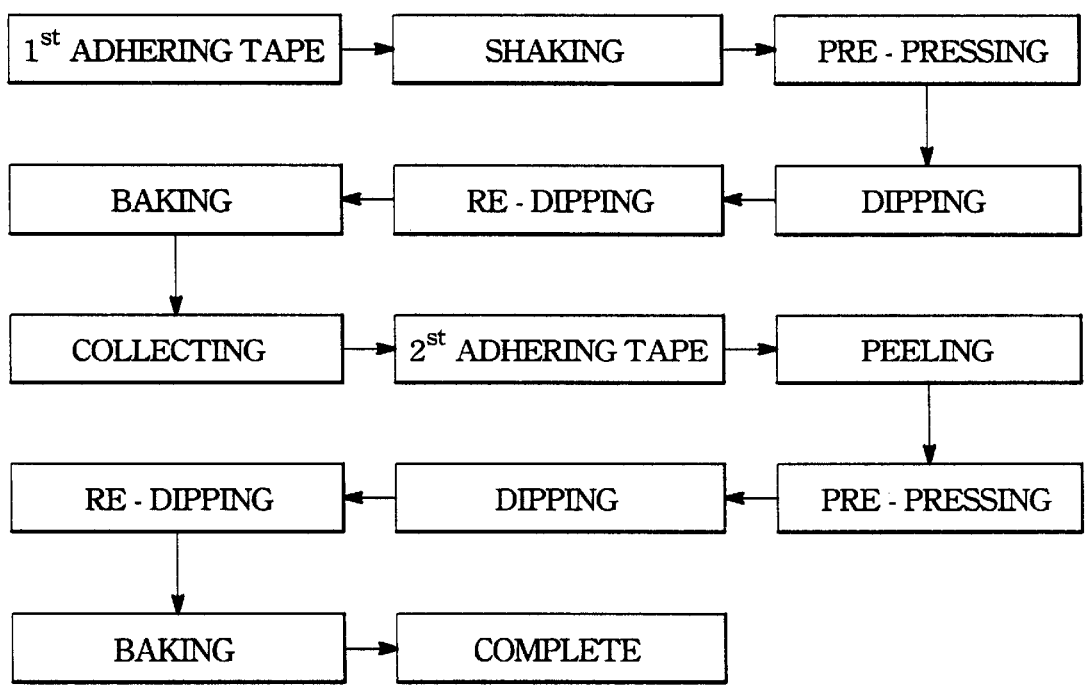
FIG. 1 is a flow charge of a preferred embodiment of the method for coating conductive metal onto an electrode for surface adhesive components in accordance with the present invention.
Figure 2:
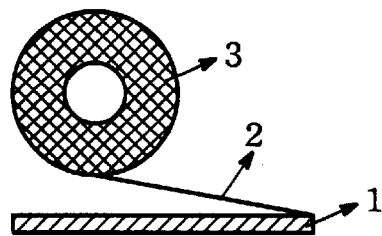
FIGS. 2(*a*), 2(*b*), 2(*c*), 2(*d*-1), 2(*d*-2) and 2(*d*-3) illustrate operating steps of a preferred apparatus for coating conductive metal onto an electrode for surface adhesive components in accordance with the present invention.
Figure 2:
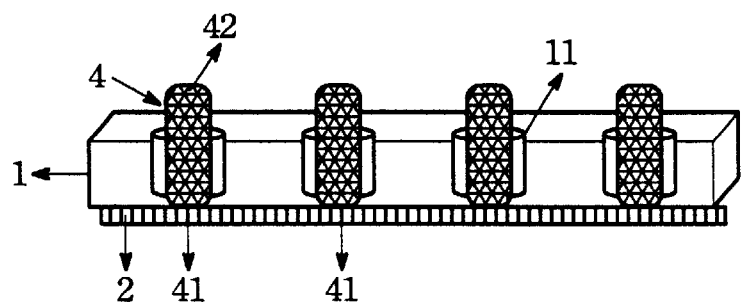
Figure 2:
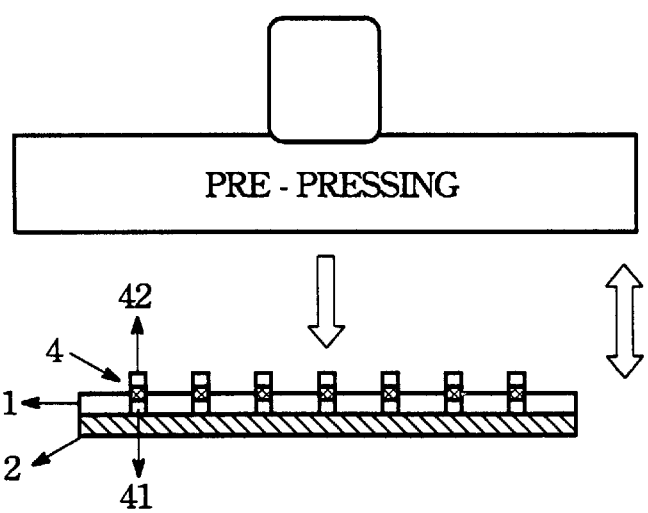

Referring now to FIG. 1, a preferred flow chart of the method for coating conductive metal onto an electrode for surface mounting chip components is shown. To carry out the method of the present invention, an operator needs to place a tooling plate 1 on a tape-posting machine firstly. The tape-posting machine can post a proper portion of a tape 2 onto a first side of the tooling plate 1 automatically and then cut the tape 2 off. Then, the tooling plate 1 adhered with the tape 2 are sent, plate by plate, into a shake feeding machine. By means of vibration provided by the shake feeding machine, components 4 such as MLCC, electric sensors, or other surface mount devices can then be vertically planted into respective holes 11 of the tooling plate 1 and thus each first end 41 of the component 4 can be adhered into the tape 2. To further ensure the adhering between the components 4 and the tape 2, a pre-pressing machine is used to depress every second end 42 of the component 4 so that the tape 2 can firmly hold each the component 4 at the first end 41 thereof, in which the component 4 is accommodated in the respective hole 11 of the tooling plate 1 with the first end 41 extended into the tape 2 adhered at the first side of the tooling plate 1 and with the opposing second end 42 extended over the opposing side of the tooling plate 1. By applying a vacuum holder 8, the components 4 exposed to the tooling plate 1 can be dipped into a liquid conductive metal trough 5 for uniformly coating metal ointment 51 onto the second ends 42 of the components 4. The uniformity of the metal coating can be achieved by a twin scraper mechanism 6 as shown in FIGS. 2(*d*-1) and (*d*-2). As shown in FIG. 2(*d*-1), when the twin scraper mechanism 6 moves rightward, a left scraper 61 thereof will be raised at a predetermined height h1 over a right scraper 62 thereof; so that an even thickness of metal ointment 51 can be prepared at a bottom of the trough 5 for further dipping process. Similarly, as shown in FIG. 2(*d*-2), when the twin scraper mechanism 6 moves leftward, the right scraper 62 will be raised at a predetermined height h2 over the left scraper 61 for re-preparing another even thickness of the metal ointment 51 and scrapping off excess metal ointment 5 on the trough 5. According to the present invention, the lifting control of the twin scraper mechanism 6 can be programmed forehand. Preferably, the downward velocity of the tooling plate 1 can be slower than the absorbency velocity of the metal ointment 51. After a first dipping process upon the components 4, the tooling plate 1 can be arranged to dip into the conductive metal trough 5 again for further modifying the shape of each coated second end 42, i.e. the conductive end of the electrode. After the dipping processes, the tooling plate 1 as well as the coated components 4 are forwarded to be baked in a roaster. After the baking, before the tape 2 at the first side of the tooling plate 1 can be removed to expose the first end 41 of each component 4, another tape 2 is applied to an opposing second side of the tooling plate 1 for adhering the coated second ends 42 of the components 4. By repeating the aforesaid processes including pre-pressing, dipping, re-dipping and baking, the first end 41 of the component 4 can also be coated with uniform conductive metal. By providing the aforesaid processes of the present invention, a component 4 can have both ends coated with conductive metal.

A apparatus for carrying out the method for coating conductive metal onto an electrode for surface mounting chip components in accordance with the present invention can be organized as follow. The apparatus comprises:

(1) a tape-posting machine as shown in FIG. 2(a), for posting the tape 2 onto one side of the tooling plate 1 to further hold the components 4;

(2) a shake feeding machine as shown in FIG. 2(b), for shaking the components 4 and having the components 4 automatically fell into the holes 11 of the tooling plate 1 to thus be adhered by the tape 2;

(3) a pre-pressing machine as shown in FIG. 2(c), for pre-pressing the components 4 stuck on the tooling plate 1 to be firmly held by the tape 2;

(4) a coating mechanism as shown in FIG. 2(d), further including a conductive metal trough 5, a twin scraper mechanism 6 and an automatic conductive metal refilling mechanism 7; for generating a uniform thickness of metal ointment at a bottom of the trough 5, the twin scraper mechanism 6 raising a left scraper 61 at a predetermined height h1 over a right scraper 62 while the mechanism 6 moving leftward, and the twin scraper mechanism 6 raising the right scraper 62 at another predetermined height h2 over the left scraper 61 while the mechanism 6 moving rightward; wherein the twin scraper mechanism 6 of the present invention is superior to a conventional single scraper mechanism by generating a uniform metal layer at each one-way movement so that the product efficiency can be increased and the production time can be greatly saved; and wherein the automatic conductive metal refilling mechanism 7 can recycle the excess metal ointment 51 by a pump 73 (ex. a twin-cam pump) from a recycle hole 71, through a tube 72 and a filter 74, and to a filing hole 75 for feeding conductive metal ointment into the trough 5;

(5) a oven, for baking the component 4 coated with the metal ointment; and (6) a vacuum holder 8, for handling the tooling plate 1 to process the dipping upon the tooling plate 1 in the liquid conductive metal trough 5.

By providing the present invention, various advantages as follow can be achieved.

(1) In the invention, the components 4 are shaken into the holes 11 of the tooling plate 1 which adheres a tape 2 at one side, and the components 4 are pre-depressed to be firmly held by the tape 2. By such an arrangement, the components 4 can be properly and steadily planted into the tape 2 and the possible damage upon the pins and components in a conventional planting process can be substantially avoided.

(2) By providing the vacuum holder 8 to handle the tooling plate 1 carrying the components 4, the exposed components 4 on the tooling plate 1 can be easily dipped into the liquid conductive metal trough 5. Also, by such arrangement, even thinner tooling plate can be applied without handling problems.

(3) In the present invention, the tape 2 is used for fixing components, which can waive the aging problem occur at a conventional silica gel.

(4) Because the tape 2 is used for fixing components 4 in the present invention, the planting quantity limitation upon a conventional silica gel plate can be thus avoided.

It may thus be seen that the object of the present invention set forth herein, as well as those made apparent from the foregoing description, are efficiently attained. While the preferred embodiments of the invention have been set forth for purpose of disclosure, modifications of the disclosed embodiment of the invention as well as other embodiments thereof may occur to those skilled in the art. Accordingly, the appended claims are intended to cover all embodiments which do not depart from the spirit and scope of the invention.

I claim:

1. A method for coating conductive metal onto an electrode, comprising:

(a) adhering a tape on a first side of a tooling plate, the tooling plate having a plurality of guiding holes therein, each guiding hole capable of accommodating a single electrode;

(b) shaking electrodes into the respective guiding holes of the tooling plate for allowing a first end of each the electrode to be adhered by the tape at the first side of the tooling plate;

(c) pre-pressing each electrode at a second end thereof opposing to the first end;

(d) holding the tooling plate having the electrodes with a vacuum holder, and having the second ends of the electrodes down for dipping into a liquid conductive metal trough;

(e) dipping the tooling plate for a pre-determined period into the liquid conductive metal trough to provide a first coating of conductive metal on the second ends of the electrodes;

(f) re-dipping the tooling plate for another pre-determined period into the liquid conductive metal trough to provide a second coating of conductive metal on the second ends of the electrodes;

(g) baking the second ends of the electrodes;

(h) applying another tape onto a second side of the tooling plate for adhering the second ends of the electrodes;

(i) removing the tape of step (a) and exposing the first ends of the electrodes;

(j) pre-pressing the first ends of the electrodes;

(k) holding the tooling plate with the vacuum holder and dipping the first ends of the electrodes into the liquid conductive metal trough for the predetermined period;

(l) baking the first ends of the electrodes; and (m) removing said another tape of step (h).

2. The method for coating conductive metal onto an electrode according to claim 1, wherein said liquid conductive metal trough has a steady liquid height maintained by a twin scraper mechanism.

3. The method for coating conductive metal onto an electrode according to claim 2, wherein said twin scraper mechanism includes first and second scrapers moveable between a first and second directions whereby a first steady liquid height is maintained by said first scraper moving said first direction and a second steady liquid height is maintained by said second scraper moving in said second direction thereof.

4. The method for coating conductive metal onto an electrode according to claim 1, wherein said tooling plate has a downward velocity less than an absorbency velocity of the liquid conductive metal.

* * * * *